(12) United States Patent
Mooney et al.

(10) Patent No.: US 6,935,757 B1
(45) Date of Patent: Aug. 30, 2005

(54) MULTI-BAND DIRECT VISION PRISM

(75) Inventors: Jonathan M. Mooney, Irvine, CA (US); William S. Ewing, Stow, MA (US); Richard J. Nelson, Brookline, NH (US)

(73) Assignee: Solid State Scientific Corporation, Hollis, NH (US)

( * ) Notice: Subject to any disclaimer, the term of this patent is extended or adjusted under 35 U.S.C. 154(b) by 0 days.

(21) Appl. No.: 10/440,875

(22) Filed: May 17, 2003

(51) Int. Cl.[7] .............................................. G02B 5/04
(52) U.S. Cl. ...................................... 359/615; 359/831
(58) Field of Search ................................ 359/615, 669, 359/670, 671, 831, 837

(56) References Cited

U.S. PATENT DOCUMENTS

| | | | |
|---|---|---|---|
| 1,898,787 A | * | 2/1933 | Newcomer .................. 359/669 |
| 2,810,323 A | * | 10/1957 | Coleman .................... 359/669 |
| 4,435,041 A | | 3/1984 | Torok et al. |
| 4,972,429 A | * | 11/1990 | Herbst ........................ 372/100 |
| 5,579,177 A | | 11/1996 | Stumpf |
| 5,596,456 A | * | 1/1997 | Luecke ....................... 359/831 |
| 5,616,922 A | | 4/1997 | Reffner |
| 5,625,499 A | * | 4/1997 | Chen .......................... 359/831 |
| 5,668,671 A | | 9/1997 | Erdmann |
| 5,994,700 A | | 11/1999 | Rajic et al. |
| 6,128,075 A | | 10/2000 | Brierley |
| 2002/0008921 A1 | | 1/2002 | Ebizuka et al. |
| 2002/0175286 A1 | | 11/2002 | Murguia |

* cited by examiner

Primary Examiner—John Juba, Jr.
(74) Attorney, Agent, or Firm—Louis J. Franco

(57) ABSTRACT

A multi-band direct prism comprising at least first and second prismatic elements of disparate refractive indices facilitates the contemporaneous analysis of dispersed emergent light energy within at least two distinct and predetermined sets of energy wavelengths wherein one wavelength within each of the at least two wavelength sets emerges from the direct vision prism with no net angular deviation.

9 Claims, 6 Drawing Sheets

Sapphire-ZnS Multi-band Direct Vision Prism Performance for Selected Visible Wavelengths Sapphire-ZnS Multi-band Direct Vision Prism Performance for Selected Mid-Wave Infrared Wavelengths The Sapphire / Zinc Sulfide Multi-band Direct Vision Prism Table 1. Prescription for a particular embodiment of the multi-band DVP.

| Material | Tilt Angle of First Surface (degrees) | Apex Angle of Prism Wedge (degrees) |
|---|---|---|
| Sapphire ($Al_2O_3$) | 19.808° | 25.277° |
| Zinc sulfide (ZnS) | 0° | −13.749° |

*FIG. 5A*

Table 2. Table of deviation angles with respect to initial angle of incidence for select visible wavelengths after refraction at each interface of the multi-band DVP whose prescription is given in Table 1.

| Wavelength | Air–Sapphire (degrees) | Sapphire–Air (degrees) | Air–ZnS (degrees) | ZnS–Air (degrees) |
|---|---|---|---|---|
| 420.0 nm | −8.854° | −20.712° | −8.083° | 0.629° |
| 457.6 nm | −8.824° | −20.577° | −8.209° | 0.000° |
| 500.0 nm | −8.798° | −20.460° | −8.305° | −0.477° |
| 600.0 nm | −8.755° | −20.273° | −8.435° | −1.114° |
| 700.0 nm | −8.728° | −20.154° | −8.499° | −1.433° |

*FIG. 5B*

Table 3. Table of deviation angles with respect to initial angle of incidence for select medium-wave infrared wavelengths after refraction at each interface of the multi-band DVP whose prescription is given in Table 1.

| Wavelength | Air–Sapphire (degrees) | Sapphire–Air (degrees) | Air–ZnS (degrees) | ZnS–Air (degrees) |
|---|---|---|---|---|
| 3.000 µm | −8.393° | −18.751° | −8.184° | −1.101° |
| 3.500 µm | −8.278° | −18.288° | −7.998° | −0.689° |
| 4.170 µm | −8.083° | −17.534° | −7.690° | 0.000° |
| 4.500 µm | −7.968° | −17.100° | −7.510° | 0.402° |
| 5.000 µm | −7.764° | −16.354° | −7.200° | 1.098° |

*FIG. 5C*

| 1st prismatic element | 2nd prismatic element |
|---|---|
| Spinel $MgAl_2O_4$ | Thallium bromoiodide KRS-5 |
| Lithium Fluoride LiF | Zinc Selenide ZnSe |
| Beryllium oxide BeO | Silver Cloride AgCl |
| Aluminum Nitride AlN | |
| Magnesium oxide MgO | |
| Magnesium fluoride $MgF_2$ | |
| Barium fluoride $BaF_2$ | |
| Lead fluoride $PbF_2$ | |
| Cesium bromide CsBr | |

*FIG. 6*

A non-exhaustive list of exemplary materials for use in the fabrication of first and second prismatic elements

MULTI-BAND DIRECT VISION PRISM

STATEMENT OF UNITED STATES GOVERNMENT RIGHTS IN THE INVENTION

This invention was made with U.S. Government support under contract F19628-99-C-0067 awarded by the United States Air Force. The U.S. Government has certain rights in this invention.

BACKGROUND

1. Field

Implementations of the present invention relate generally to the field of optics and more particularly to Direct Vision Prisms or DVPs.

2. Brief Description of an Illustrative Environment and Related Art

Spectral analysis of polychromatic electromagnetic radiation (which may hereinafter be referred to as "light," regardless of the wavelength range) typically relies on dispersive optical elements such as gratings or prisms. A prism is commonly a slab or alternatively configured mass of refractive material with nonparallel incident and emergent faces, although prisms having parallel faces exist. White light is an example of polychromatic light and, by definition, comprises a plurality of constituent, disparate wavelengths of electromagnetic energy. As those of ordinary skill in the art of optics appreciate, when a column of white light is caused to enter a first (e.g., incident) face of a prism, the various constituent visible wavelengths, for instance, emerge from a second (e.g., emergent) face deviated by different angles $\delta$ (i.e., dispersed into the visible spectrum) because the refractive index of the material from which a prism is fabricated depends on wavelength. The angle of deviation $\delta$ between the incident and each emergent ray depends, for a given incident angle, on the refractive index of the prism and its apex angle $\phi$, wherein the apex angle $\phi$ indicates the angular disposition between a first plane parallel to the first prism face and a second plane parallel to the second prism face. It is common to refer to unit vectors normal to each of the first (e.g., incident) and second (e.g., emergent) faces of prisms in order to describe the angular disposition of the faces with respect to one another.

A typical prism element in an optical spectrometer is the direct vision prism (hereinafter, DVP), designed such that one wavelength of light in a band (examples, ultraviolet, visible, and infrared), or region of interest, in the electromagnetic spectrum passes through the prism with no angular deviation. A direct vision prism contains two or more prismatic elements of differing refractive indices over the region or regions of interest to produce a spectrum in which the angular deviation depends on the wavelength difference from the un-deviated wavelength in accordance with Snell's Law. The un-deviated wavelength serves as a reference to which deviated wavelengths are comparatively analyzed. Technically, even the "un-deviated" wavelength is deviated as it passes through each optical-medium interface within the DVP system, but emerges from the DVP system with no "net" angular deviation with respect to the angle of incidence of the polychromatic light column of which it was a part. Moreover, non-deviation refers to 0° or near-0° angular deviation, as an incident "ray" line representative of the un-deviated wavelength may experience a net linear displacement or "shift" with respect to a reference axis parallel to the ray line representing an incident polychromatic column of light, but emerges parallel thereto.

Direct vision prisms representative of the current state of the art are single-band devices. That is, although a particular DVP embodying the current state of the art may disperse wavelengths in more than one of the commonly recognized energy bands, current DVPs are such that only a single wavelength of energy, regardless of the range of constituent wavelengths in the incident light column, emerges un-deviated. Consequently, analysis of dispersed energy in each of two or more sets of wavelength ranges with respect to an un-deviated wavelength within that range currently requires the substitution of apparatus which often renders complete spectral analysis cumbersome, tedious, time consuming and costly.

Accordingly, a need exists for a direct vision prism that renders possible the contemporaneous analysis of dispersed emergent light energy within at least two distinct and predetermined sets of energy wavelengths wherein one wavelength within each of the at least two wavelength sets emerges from the direct vision prism with no net angular deviation.

SUMMARY

In various implementations, a multi-band direct vision prism system includes a plurality of prismatic elements comprising at least first and second prismatic elements fabricated from, respectively, first and second materials of differing first and second refractive indices. Typically embodied, the first prismatic element has an incident face corresponding to the incident face of the multi-band direct vision prism system and an exit face opposite and nonparallel to the incident face and is characterized by a first apex angle defining the angular disposition of a first unit vector normal to a first plane parallel to the incident face with respect to a second unit vector normal to a second plane parallel to the exit face. The second prismatic element has an entrance face and an emergent face opposite and nonparallel to the entrance face, the emergent face corresponding to the emergent face of the direct vision prism system. Analogously to the first prismatic element, the second prismatic element is characterized by a second apex angle defining the angular relationship between a plane parallel to the entrance face and a plane parallel to the emergent face. When the angular disposition of the first and second faces of a prismatic element is such that first and second planes parallel to the first and second faces do not intersect, the faces are parallel and the apex angle is zero. This corresponds to the first and second unit vectors normal to, respectively, the first and second planes being disposed in anti-parallel relationship (i.e., defining an angle of 180°).

As with embodiments including only first and second prismatic elements, each prismatic element of the plurality of prismatic elements in an embodiment including three or more prismatic elements has (i) a refractive index, (ii) a first face through which constituent wavelengths of an incident polychromatic light column enter that prismatic element, (iii) a second face through which constituent wavelengths of the polychromatic light column exit that prismatic element and (iv) an apex angle defining the angle at which the second face is disposed with respect to the first face. At least two of the prismatic elements in the system have different refractive indices. Moreover, the first face of each prismatic element is disposed at a predetermined tilt angle with respect to a common optical axis. For purposes of the specification and appended claims, some license is taken in using the term "optical axis" to denote a common reference or system axis. Accordingly, as will be appreciated from the detailed description and drawings, for purposes of the description and claims, the term "optical axis" is not limited to its more technical definition in which the term denotes an axis of symmetry in, for example, a lens system. The refractive indices, apex angles and tilt angles are selected such that a single wavelength within each of at least two predetermined energy bands within a polychromatic light column propagating parallel to an incident axis and incident upon the incident face of the direct vision prism system emerges from the emergent face of the direct vision prism system with no net angular deviation with respect to the incident axis.

Although the point will be obvious to one of ordinary skill in the art, it is to be understood that, once the various constituent wavelengths within the incident polychromatic light column traverse the first interface between the environment (e.g., vacuum, air or other fluid) and the first prismatic element in the system, they will, by definition, no longer be collimated. However, the incident path of the initial light column is sufficient to establish the incident axis for the entire system. Additionally, the incident axis parallel to which the polychromatic light column propagates need not be parallel to the common optical axis designated for the direct vision prism system as a whole, but analysis of the system and dispersed energy emerging therefrom may be simplified by choosing incident and common optical axes that coincide.

In various alternative embodiments of a multi-band direct vision prism system, the first and second prismatic elements are arranged such that a common optical axis passes through the incident and exit faces of the first prismatic element and the entrance and emergent faces of the second prismatic element. The incident face of the first prismatic element is disposed at a first tilt angle with respect to a plane perpendicular to the common optical axis and the entrance face of the second prismatic element is disposed at a second tilt angle with respect to a plane perpendicular to the common optical axis. It is to be understood that a tilt angle of zero degrees corresponds to an attitude in which a face is perpendicular to the optical axis. It will readily occur to those of ordinary skill in the art that if, for instance, the tilt angles of the incident and entrance faces are known, the tilt angles of the exit and emergent faces can be ascertained if the apex angles of, respectively, the first and second prismatic elements are known. In other words, for each prismatic element, if two variables of (i) tilt angle of the first face, (ii) apex angle and (iii) tilt angle of the second face are known, basic geometry allows one to calculate the value of the third variable.

Just as the use of unit vectors normal to the first and second faces of a prismatic element is a convenient way of representing the angular disposition between the first and second faces (i.e., the apex angle), the representation of face tilt angles with respect to the common optical axis is conveniently represented by the use of unit vectors normal to the faces. The use of unit vectors simplifies conceptualization of angular relationships between two faces, between a face and a system axis and between and among dispersed wavelengths of light, particularly when, for example, variously dispersed rays are non-coplanar or when, in addition to being tilted with respect to a first face, the second face of a prismatic element is also "rotated" about a common system axis with respect to a first face of the prismatic element. For example, while the first unit vector normal to the first face of a prismatic element defines a plane with the second unit vector normal to the second face of the same prismatic element, the plane defined thereby is not necessarily the same plane defined by the first unit vector and the common optical axis. More specifically, if a Cartesian system is selected such that the x-y plane is defined by the first unit vector and the common optical axis, and the optical axis corresponds to the x-axis, then the angular relationship between the first unit vector and the common optical axis can be fully described through specification of a single angle in the x-y plane because the first unit vector has x and y components greater than zero in magnitude, but a z-component of zero magnitude. The second unit vector, however, may have components of non-zero magnitude along all three of the x, y and z coordinates, thereby defining a plane with the first unit vector that is angularly displaced (e.g., rotated about the x-axis) with respect to the x-y plane. This observation applies equally to the expression of tilt angles; if a face tilt angle is defined, for example, in terms of the angular disposition of a unit vector normal to the face and the common optical axis, then the planes defined by the common optical axis and each of two unit vectors normal to each of two faces may be angularly displaced with respect to one another.

In various implementations, a multi-band direct vision prism system having only first and second prismatic elements is such that the exit face of the first prismatic element is retained in contacting engagement with the entrance face of the second prismatic element such that alteration of the first tilt angle by a predetermined number of degrees results in a corresponding alteration of the second tilt angle and such that the exit and entrance faces are necessarily at the same tilt angle. In alternative embodiments, the exit face of the first prismatic element is separated from the entrance face of the second prismatic element such that the first and second tilt angles can be independently altered. It will be appreciated that, when a face from one prismatic element in the system is secured in contacting engagement with a face of another prismatic element in the system, the total number of interfaces is reduced relative to the number of interfaces that exists for a system having the same number of prismatic elements in which no face is secured in contacting engagement with another face. Accordingly, the number of interfaces in the system is regarded as another variable whose value can be altered.

A dual-band direct vision prism represents a special case of a multi-band direct vision prism and is useful in conveying the basic features of multi-band DVPs more generally. A dual-band DVP is capable of transmitting and dispersing a set of wavelengths in each of two distinct energy bands. It will be appreciated that "large" (i.e., detectable) dispersions are advantageous in a spectroscopic system as opposed, for example, to an achromatic or apochromatic optical system in which the object is to refract light without spectral color separation. For instance, in an illustrative implementation, a dual-band DVP transmits and disperses energy within a first set of wavelengths belonging to a first energy band (e.g., a set of wavelengths within the visible region) and a second set of wavelengths belonging to a second energy band (e.g., a set of wavelengths within and/or designated as medium-wave infrared). Moreover, a predetermined wavelength within each of the two sets of wavelengths emerges from the DVP (e.g., the emergent face of the second prismatic element in a DVP consisting of only two prismatic elements) with no net angular deviation with respect to the common optical axis. Wavelengths other than the undeviated wavelength within each of the first and second sets of wavelengths, as previously indicated, are measurably dispersed in order to facilitate spectral analysis.

It will be appreciated that the creation of a DVP exhibiting the aforementioned characteristic requires consideration and reconciliation of a variety of variables. To begin, the materials from which the prismatic elements of the DVP are fabricated must each be capable of transmitting the wavelengths of interest in each of the first and second sets of wavelengths. In addition, (i) the first and second refractive indices, (ii) the first and second apex angles and (iii) the first and second tilt angles must be selected such that a single wavelength from each of at least a first energy band and a second energy band within a polychromatic column of light propagating parallel to the common optical axis and incident upon the incident face of the first prismatic element emerges from the emergent face of the second prismatic element angularly un-deviated with respect to the common optical axis. Provided with the benefit of this disclosure, persons of ordinary skill in the optical arts will appreciate that numerous combinations of the preceding variables may exist to achieve any two predetermined un-deviated wavelengths in two distinct energy bands.

Although virtually any two different optical media with acceptable transmission ranges can be combined to create a direct vision prism for very narrow electromagnetic bands of interest, the inventors note that a ratio of the dispersion difference of any two materials from which cooperating prismatic elements are fabricated across each band of interest that is significantly different than unity is advantageous in achieving dispersion suitable for imaging onto a sensor array, for example. In other words, the combining of two materials having, across each band of interest, a very large or very small dispersion difference ratio with respect to unity (i.e., 1 to 1 relationship) is an advantage in achieving a direct vision prism that is sufficiently dispersive to distinguish wavelengths of interest within each band of interest. Generally, the more dispersive the combination of first and second materials from which first and second prismatic elements are fabricated, the greater the resultant angles of deviation between wavelengths of interest. The greater the resultant angles of deviation between wavelengths of interest, the easier and more precise the analysis of those wavelengths. Through reading the detailed description, and examining FIGS. 5B and 5C, the reader will more fully appreciate that the resultant angles of deviation between each dispersed wavelength and its corresponding un-deviated reference wavelength are fairly small in many instances by, for example, naked-eye standards and the standards of less modern sensing instruments. However, advances in the fabrication of high-resolution sensor arrays have rendered analyzable individual wavelengths dispersed at angles that previously were to too small to render useful distinctions.

As will be more fully appreciated through examination of the detailed description and the associated drawings, various embodiments of a multi-band DVP are such that (i) with respect to energy within a first energy band, wavelengths shorter than the un-deviated wavelength emerge angularly deviated at positive angles and wavelengths longer than the un-deviated wavelength emerge angularly deviated at negative angles and (ii) with respect to energy within a second energy band, wavelengths longer than the un-deviated wavelength emerge angularly deviated at positive angles and wavelengths shorter than the un-deviated wavelength emerge angularly deviated at negative angles. The designation of angles of emergence as being either positive or negative is, of course, entirely arbitrary, the only material distinction being that a wavelength emerging at, for instance, a "positive" angle emerges at an angle of opposite sign from a wavelength emerging at a "negative" angle with respect to the axis defined by the emergent un-deviated reference wavelength of the energy band under consideration.

The dispersion of various wavelengths within a selected wavelength range may not occur neatly along a single plane as defined, for example, by the ray representing the incident polychromatic light column and any of the emergent rays; the variously dispersed rays may be non-coplanar. For instance, if the ray representing the incident polychromatic light column and the ray representing the un-deviated wavelength define a plane (i.e., they are not colinear), and that plane is selected as an analytical reference plane, then planes defined by angularly deviated wavelengths within the same selected wavelength range as the un-deviated wavelength and the ray representing the incident polychromatic light column may be angularly displaced with respect to the analytical reference plane (e.g., rotated about the axis corresponding to the incident ray). Accordingly, with respect to the reference plane, a complete description of the behavior of a ray corresponding to a deviated wavelength may require, in the alternative, two angles (e.g., one in each of two coordinate planes) or three axial coordinates, for example. In recognition of such instances, the term "deviation angle" is defined broadly enough for purposes of the description and the appended claims to include and refer to an angle set including two angles. Accordingly, the term "deviation angle set" may be used interchangeably with "deviation angle." In cases in which the plane defined by a deviated wavelength ray and the incident ray is the same as the reference plane and, for example, the reference plane is designated as the x-y plane, there is no z-component of the ray for that deviated wavelength and, therefore, the component of angular deviation along the x-z plane is 0°.

Representative embodiments are more completely described in the following detailed description, the elucidation of which is facilitated by the schematic representations of, and numerical and graphical data relating to, an illustrative embodiment contained in the accompanying drawings.

BRIEF DESCRIPTION OF THE DRAWINGS

FIG. 5A is a table including specifications for the first and second prismatic elements of FIGS. 1 and 2;

FIG. 5B is a tabulation of the net cumulative angular deviation with respect to an incident axis for each wavelength within a first set of selected visible wavelengths once that wavelength has traversed each of the four optical interfaces depicted in FIGS. 1 and 2;

FIG. 5C is a tabulation of the net cumulative angular deviation with respect to an incident axis for each wavelength within a second set of medium-wave infrared wavelengths once that wavelength has traversed each of the four optical interfaces depicted in FIGS. 1 and 2; and FIG. 6 is a table including a non-exhaustive list of illustrative materials from which to fabricate first and second prismatic elements.

DETAILED DESCRIPTION

The following description of a multi-band direct vision prism system is illustrative in nature and is therefore not intended to limit the scope of the invention or its application of uses. Moreover, the description provides a simple illustrative case in which dispersion occurs in two-dimensions.

Figure 1:
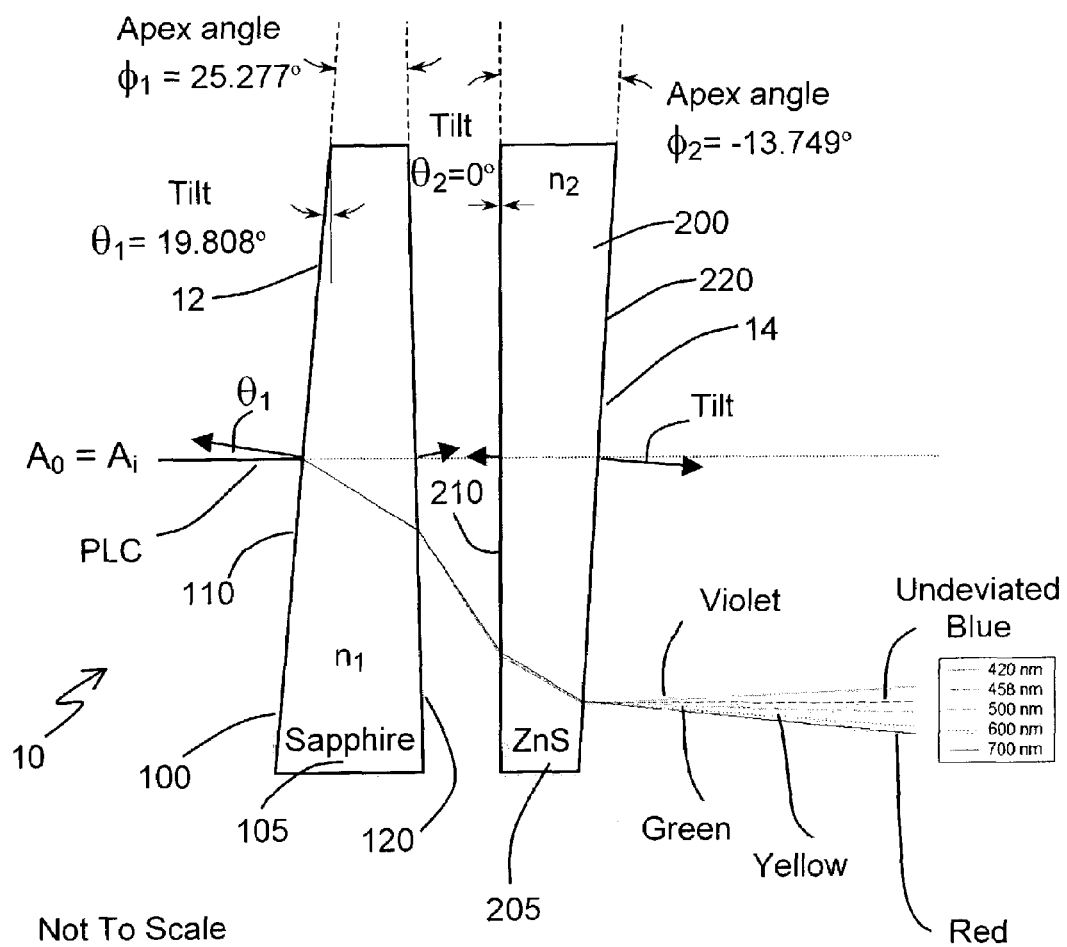
FIG. 1 schematically depicts the dispersion of representative wavelengths within a first set of wavelengths including the range of wavelengths from 420 nm to 700 nm when a polychromatic light column including the first set of wavelengths is caused to enter the incident face of an illustrative multi-band direct vision prism.
Figure 2:
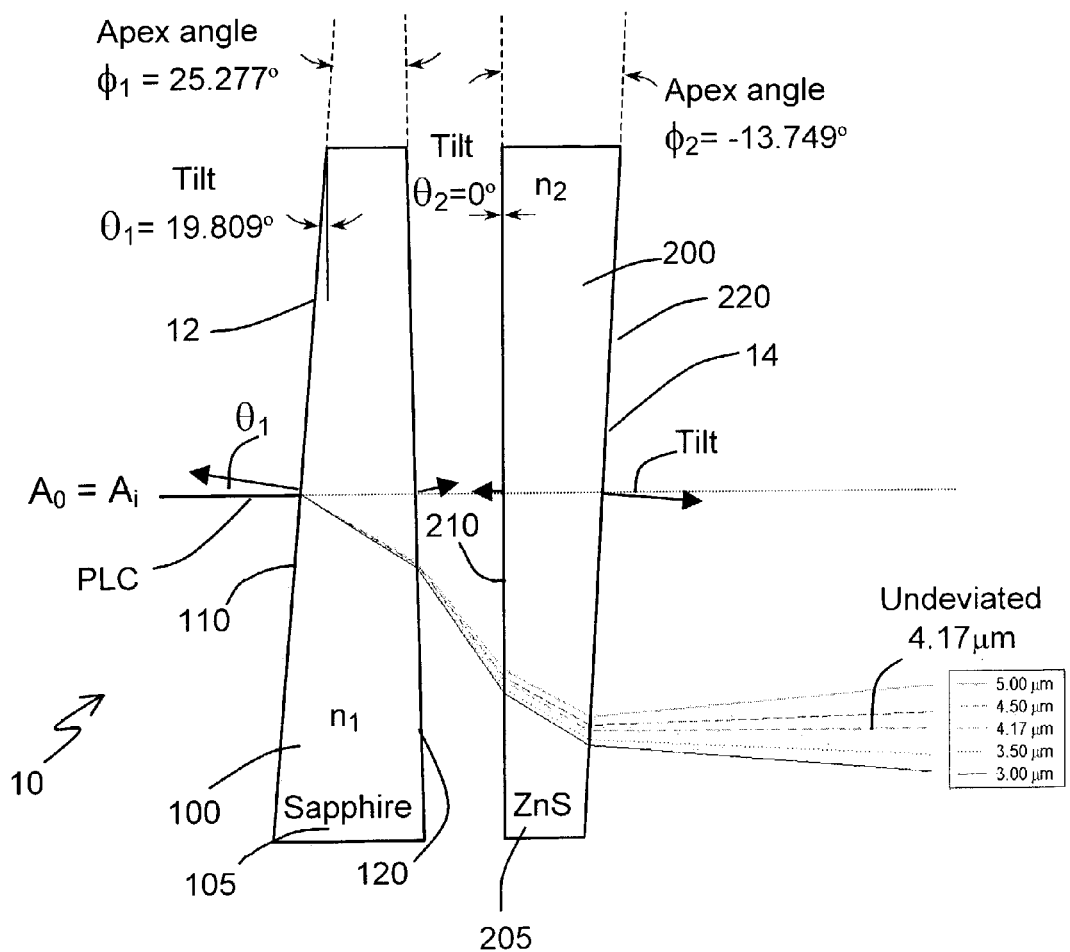
FIG. 2 schematically depicts the simultaneous dispersion of representative wavelengths within a second set of wavelengths including the range of wavelengths from 3.0 $\mu$m to 5.0 $\mu$m when the polychromatic light column of FIG. 1, which includes the second set of wavelengths, is caused to enter the incident face of the illustrative multi-band direct vision prism of FIG. 1.

FIGS. 1 and 2 diagram an illustrative multi-band direct vision prism (which may be alternatively referred to as MBDVP or multi-band DVP) 10. The MBDVP 10 of FIGS. 1 and 2 includes a first prismatic element 100 and a second prismatic element 200. The first prismatic element 100 is fabricated from a first material 105 and the second prismatic element 200 is fabricated from a second material 205. In the particular embodiment represented by FIGS. 1 and 2, the first material 105 is sapphire ($Al_2O_3$) and the second material 205 is zinc sulfide (ZnS). As will be more fully appreciated further in the detailed description, the multi-band DVP 10 of FIGS. 1 and 2 represents a single example of a multi-band DVP 10 fabricated for analysis of electromagnetic energy in each of the visible and medium-wave infrared bands of the electromagnetic spectrum.

Although the index of refraction of each of sapphire and zinc sulfide, as with most optical media, varies with wavelength, it is common to refer to the index of refraction (i.e., refractive index) as if the refractive index of a material were a fixed quantity. However, understood by those of ordinary skill in the art when two materials are referred to has having different refractive indices is that the materials in question exhibit distinct indices of refraction over a substantial number, if not all, wavelengths within a spectral range of interest. For instance, two materials may have the same index of refraction at one particular wavelength at which the plots of refractive index vs. wavelength for the materials cross in a graph, but disparate indices of refraction for all other wavelengths within the range or region of interest. Such materials would be deemed to have differing refractive indices. "Refractive index," "index of refraction" and syntactical derivatives and variations thereof are used throughout the specification and claims in the manner described above and not in a manner that denotes an absolute fixed quantity unless indicated by context. For instance, it is understood that the refractive index of a particular material at a particular temperature and pressure is a fixed quantity for a given wavelength.

Figure 3:
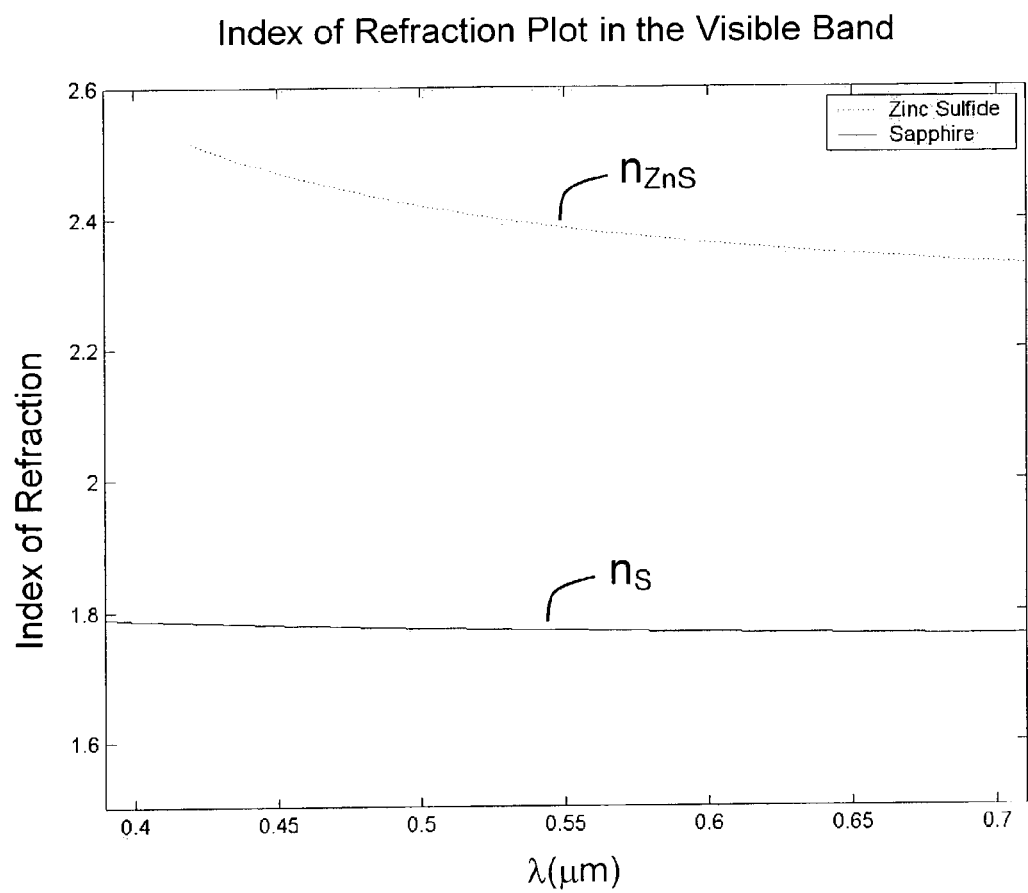
FIG. 3 is a graphic plot of index of refraction versus wavelength, across the visible region, for each of sapphire and zinc sulfide, the materials from which, respectively, the first and second prismatic elements of the illustrative multi-band direct vision prism of FIGS. 1 and 2 are fabricated.
Figure 4:
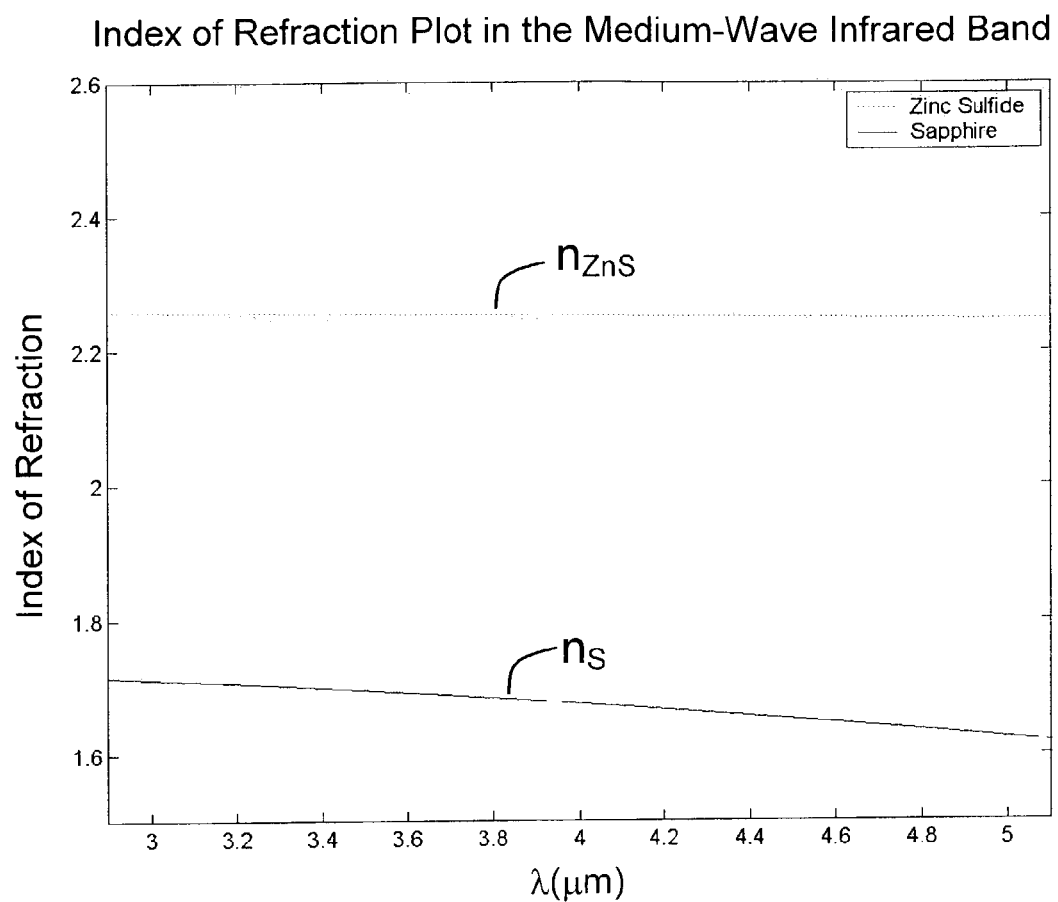
FIG. 4 is a graphic plot of index of refraction versus wavelength, in the medium-wave infrared region, for each of the sapphire and zinc sulfide prismatic elements shown in FIGS. 1 and 2.

Referring to FIG. 3, the indices of refraction $n_s$ and $n_{zns}$ as a function of wavelength are plotted for each of sapphire and zinc sulfide along a first range of wavelengths extending through the visible band and beginning at a wavelength of slightly shorter than 0.4 microns ($4.0 \times 10^{-7}$ m) and ending at a wavelength just longer than 0.7 microns ($7.0 \times 10^{-7}$ m). Similarly, in FIG. 4, the indices of refraction $n_s$ and $n_{zns}$ as a function of wavelength are plotted for each of sapphire and zinc sulfide along a second range of wavelengths extending through the medium-wave infrared band and beginning at a wavelength of slightly shorter than 3.0 microns ($3.0 \times 10^{-6}$ m) and ending at a wavelength just longer than 5.0 microns ($5.0 \times 10^{-6}$ m). The graph of FIG. 3 reveals that, over the range of visible wavelengths represented, the refractive index $n_s$ of sapphire varies very little relative to the amount by which the refractive index $n_{zns}$ of zinc sulfide varies over the same range of wavelengths, while, in the medium-wave infrared band, as represented by the graph of FIG. 4, the refractive index $n_{zns}$ of zinc sulfide varies very little relative to the amount by which the refractive index $n_s$ of sapphire varies over the range of interest. The reason for this phenomenon will be more fully appreciated further in this detailed description, but, for the present, it can be conceptualized in terms of an offset effect. That is, the first and second materials 105 and 205 are selected such that one of the first and second prismatic elements 100 and 200 has a lesser dispersive effect on wavelengths within a first set of wavelengths of interest than the other of the first and second prismatic elements 100 and 200 and such that it has a greater dispersive effect than the other of the first and second prismatic elements 100 and 200 on wavelengths within a second set of wavelengths of interest.

Referring again to FIGS. 1 and 2, and to FIG. 5A, specifications of the illustrative embodiment are indicated. In addition, rays tracing exemplary wavelengths within the visible and medium-wave infrared bands are illustrated in FIGS. 1 and 2, while the actual angle of deviation of each exemplary ray at each of the four prism faces is tabulated for the visible band in FIG. 5B and for the medium-wave infrared in FIG. 5C. To avoid confusion, the rays tracing exemplary wavelengths in the visible band are illustrated in FIG. 1 and the rays tracing exemplary wavelengths in the medium-wave infrared band are illustrated in FIG. 2. However, it is to be understood that, with the specifications indicated, the rays of the visible and medium-wave infrared bands emerge simultaneously.

Referring to FIG. 1, the first prismatic element 100 has a planar incident face 110 and a planar exit face 120 opposite and nonparallel to the incident face 110. The incident and exit faces 110 and 120 are disposed at a first apex angle $\phi_1$ of 25.277° with respect to one another. The second prismatic element 200 includes a planar entrance face 210 and a planar emergent face 220 opposite and nonparallel to the entrance face 220. The emergent face 220 is disposed at a second apex angle $\phi_2$ of 13.749° with respect to the entrance face 210. In the two-prism multi-band DVP 10 of FIGS. 1 and 2, the incident face 110 of the first prismatic element 100 corresponds to the incident face 12 of the multi-band DVP 10 and the emergent face 220 of the second prismatic element 200 corresponds to the emergent face 14 of the multi-band DVP 10.

The first and second prismatic elements 100 and 200 are arranged such that a common optical axis $A_o$ passes through the incident and exit faces 110 and 120 of the first prismatic element 100 and the entrance and emergent faces 210 and 220 of the second prismatic element 200. The incident face 110 is disposed at a first tilt angle $\theta_1$ of −19.808° and the entrance face 210 is disposed at a second tilt angle $\theta_2$ of 0°. Based on the known values of the first and second apex angles $\phi_1$ and $\phi_2$, simple geometry indicates that the exit face 120 of the first prismatic element 100 is disposed at a tilt angle of 5.468° and the emergent face 220 of the second prismatic element 200 is disposed at a tilt angle of 13.749°.

As previously stated, FIG. 1 includes trace rays for each of five illustrative wavelengths in a first band of interest (i.e., the visible band) included in a polychromatic light column PLC incident upon the incident face 110 of the first prismatic element 100 along a path parallel to an incident axis $A_i$ and, in this particular case, the common optical axis $A_o$ while FIG. 2 includes trace rays for five illustrative wavelengths in a second band of interest (the medium-wave infrared) included in the same light column PLC of FIG. 1. An angle of deviation δ was calculated, by applying Snell's Law and the data represented by the index of refraction plot of FIG. 3, for each of the illustrative wavelengths at each of the four interfaces shown in FIG. 1. The table of FIG. 5B includes deviation data for each wavelength represented by a trace ray in FIG. 1 at each of the four interfaces at which angular deviation occurs. The deviation angles δ for each wavelength at each interface in the table of FIG. 5B represent the cumulative deviation of that wavelength with respect to the incident axis $A_i$ of the incident polychromatic light column PLC after crossing the interface corresponding to that deviation angle δ. For instance, the ray representing the 500.0 nm wavelength is deviated negatively at an angle of 8.798° at the air-sapphire interface. At the second interface (i.e., the sapphire-air interface), the total, cumulative deviation between the incident axis $A_i$ and the 500.0 nm ray is −20.460°. In crossing the third interface, the 500.0 nm ray is deviated positively by 12.155° such that its total net deviation with respect to the incident axis $A_i$ after crossing the air-ZnS interface is −8.305°. Finally, the 500.0 nm ray emerges from the multi-band DVP 10 with a net deviation of −0.477° after being deviated upwardly by 7.828° at the fourth (i.e., ZnS-air) interface.

As shown schematically in FIGS. 1 and 2, and numerically in FIGS. 5B and 5C, one wavelength in each of the first and second energy bands of interest experiences a net deviation of 0° in passing through all four interfaces of the multi-band DVP 10. More particularly, in the visible region, the 457.6 nm ray, while deviated at each of the four interfaces, emerges from the multi-band DVP 10 parallel to the incident axis $A_i$ of incident light column PLC. Similarly, the 4.170 μm ray in the medium-wave infrared band undergoes four angular deviations, but emerges from the multi-band DVP 10 with no net angular deviation. Moreover, wavelengths within the first band of interest shorter than the un-deviated reference wavelength of 457.6 nm are deviated at positive angles. Conversely, wavelengths within the first band of interest longer than the un-deviated reference wavelength are deviated at negative angles. In the second band of interest, the reverse is true; wavelengths longer than the un-deviated reference wavelength of 4.170 μm are deviated at positive angles, while wavelengths shorter than the un-deviated reference wavelength are deviated at negative angles.

As previously emphasized, the figures schematically, numerically and graphically represent specifications and behavior of only a single illustrative embodiment within the scope and contemplation of the invention. In alternative embodiments, the variables of (i) refractive indices $n_1$ and $n_2$ of the first and second materials 105 and 205, (ii) first and second tilt angles $\theta_1$ and $\theta_2$, and (iii) first and second apex angles $\phi_1$ and $\phi_2$ are selected such that a single wavelength from each of a first and second energy band within a polychromatic light column PLC propagating parallel to an incident axis $A_i$ and incident upon the incident face 12 of the multi-band DVP 10 emerges from the emergent face 14 of the of the multi-band DVP 10 angularly un-deviated with respect to the incident axis $A_i$ and such that wavelengths other than the undeviated wavelength within each of the first and second energy bands are measurably dispersed in order to facilitate spectral analysis.

Referring to FIG. 6, a non-limiting set of materials usable as first and second materials 105 and 205 is provided. Each exemplary material listed in each of the first and second columns can serve as either one of the first material 105 and the second material 205 in combination with, for example, a material from the other column serving as the other of the first and second materials 105 and 205. More specifically, in various embodiments, one of the first material and second materials 105 and 205 is selected from among a first set of materials including (i) sapphire, (ii) spinel, (iii) lithium fluoride, (iv) beryllium oxide, (v) aluminum nitride, (vi) magnesium oxide, (vii) magnesium fluoride, (viii) barium fluoride, (ix) lead fluoride, and (x) cesium bromide and the other of the first and second materials 105 and 205 is selected from among a second set of materials including (a) zinc sulfide, (b) thallium bromoiodide, (c) zinc selenide and (d) silver chloride. Some combinations have been found to yield more satisfactory results than others, the combination of sapphire and zinc sulfide having yielded particular satisfactory results.

The foregoing is considered to be illustrative of the principles of the invention. Furthermore, since modifications and changes to various aspects and implementations will occur to those skilled in the art without departing from the scope and spirit of the invention, it is to be understood that the foregoing does not limit the invention as expressed in the appended claims to the exact construction, implementations and versions shown and described.

What is claimed is:

1. A spectroscopic multi-band direct vision prism system comprising:

a plurality of at least two prismatic elements including a first prismatic element having an incident face corresponding to the incident face of the multi-band direct vision prism system and a second prismatic element having an emergent face corresponding to the emergent face of the multi-band direct vision prism system, each prismatic element of the plurality of prismatic elements having (i) a refractive index, (ii) a first face through which constituent wavelengths of a polychromatic light column enter that prismatic element, (iii) a second face through which constituent wavelengths of the polychromatic light column exit that prismatic element and (iv) an apex angle defining the angle at which the second face is disposed with respect to the first face, the first face of each prismatic element being disposed at a predetermined tilt angle with respect to a common optical axis, wherein at least two of the prismatic elements have different refractive indices and (i) the refractive indices, (ii) the apex angles and (iii) the tilt angles are selected such that a single wavelength within each of at least two predetermined energy bands within a polychromatic light column propagating parallel to an incident axis and incident upon the incident face of the direct vision prism system emerges from the emergent face of the direct vision prism system with no net angular deviation with respect to the incident axis and such that wavelengths other than the undeviated wavelength within each predetermined energy band are measurably dispersed in order to facilitate spectral analysis;

wherein one of the prismatic elements comprises a material selected from a first set of materials consisting of (i) sapphire, (ii) spinel, (iii) lithium fluoride, (iv) beryllium oxide, (v) aluminum nitride, (vi) magnesium oxide, (vii) magnesium fluoride, (viii) barium fluoride, (ix) lead fluoride, and (x) cesium bromide and another of the prismatic elements comprises a material selected from a second set of materials consisting of (a) zinc sulfide, (b) thallium bromoiodide, (c) zinc selenide and (d) silver chloride.

2. The multi-band direct vision prism system of claim 1 wherein
   (i) with respect to energy within a first band, wavelengths shorter than the un-deviated wavelength emerge angularly deviated at positive angles and wavelengths longer than the un-deviated wavelength of the first band emerge angularly deviated at negative angles with respect to the incident axis; and
   (ii) with respect to energy within a second band, wavelengths longer than the un-deviated wavelength emerge angularly deviated at positive angles and wavelengths shorter than the un-deviated wavelength of the second energy band emerge angularly deviated at negative angles with respect to the incident axis.

3. A spectroscopic dual-band direct vision prism system comprising:
   a first prismatic element having a planar incident face, a planar exit face opposite and nonparallel to the incident face and a first apex angle, the first prismatic element being fabricated from a first material having a first refractive index; and
   a second prismatic element having a planar entrance face, a planar emergent face opposite and nonparallel to the entrance face and a second apex angle, the second prismatic element being fabricated from a second material having a second refractive index different from the first refractive index, the first and second prismatic elements being arranged such that a common optical axis passes through the incident, exit, entrance and emergent faces of the respective ones of the first and second prismatic elements with the incident face of the first prismatic element disposed at a first tilt angle with respect to the optical axis and the entrance face of the second prismatic element disposed at a second tilt angle with respect to the optical axis, wherein (i) the first and second refractive indices, (ii) the first and second apex angles and (iii) the first and second tilt angles are selected such that a single wavelength from each of at least a first energy band and a second energy band within a polychromatic column of light propagating parallel to the common optical axis and incident upon the incident face of the first prismatic element emerges from the emergent face of the second prismatic element angularly un-deviated with respect to the common optical axis and such that wavelengths other than the undeviated wavelength within each of the first and second energy bands are measurably dispersed in order to facilitate spectral analysis;
   wherein one of the first and second bands includes wavelengths selected from the range between and including each of 400 and 800 nanometers and the other of the first and second bands includes wavelengths selected from the range between and including each of 2.5 microns and 5.5 microns.

4. The multi-band direct vision prism of claim 3 wherein one of the first and second prismatic elements comprises a material selected from a first set of materials consisting of (i) sapphire, (ii) spinel, (iii) lithium fluoride, (iv) beryllium oxide, (v) aluminum nitride, (vi) magnesium oxide, (vii) magnesium fluoride, (viii) barium fluoride, (ix) lead fluoride, and (x) cesium bromide and the other of the first and second prismatic elements comprises a material selected from a second set of materials consisting of (a) zinc sulfide, (b) thallium bromoiodide, (c) zinc selenide and (d) silver chloride.

5. A spectroscopic multi-band direct vision prism system comprising:
   a first prismatic element having a planar incident face, a planar exit face opposite and nonparallel to the incident face and a first apex angle, the first prismatic element being fabricated from a first material having a first refractive index; and
   a second prismatic element having a planar entrance face, a planar emergent face opposite and nonparallel to the entrance face and a second apex angle, the second prismatic element being fabricated from a second material having a second refractive index different from the first refractive index, the first and second prismatic elements being arranged such that a common optical axis passes through the incident, exit, entrance and emergent faces of the respective ones of the first and second prismatic elements with the incident face of the first prismatic element disposed at a first tilt angle with respect to the optical axis and the entrance face of the second prismatic element disposed at a second tilt angle with respect to the optical axis, wherein (i) the first and second refractive indices, (ii) the first and second apex angles and (iii) the first and second tilt angles are selected such that a single wavelength from each of at least a first energy band and a second energy band within a polychromatic column of light propagating parallel to the common optical axis and incident upon the incident face of the first prismatic element emerges from the emergent face of the second prismatic element angularly un-deviated with respect to the common optical axis and such that wavelengths other than the undeviated wavelength within each of the first and second energy bands are measurably dispersed in order to facilitate spectral analysis;
   wherein one of the first and second prismatic elements comprises a material selected from a first set of materials consisting of (i) sapphire, (ii) spinel, (iii) lithium fluoride, (iv) beryllium oxide, (v) aluminum nitride, (vi) magnesium oxide, (vii) magnesium fluoride, (viii) barium fluoride, (ix) lead fluoride, and (x) cesium bromide and the other of the first and second prismatic elements comprises a material selected from a second set of materials consisting of (a) zinc sulfide, (b) thallium bromoiodide, (c) zinc selenide and (d) silver chloride.

6. The multi-band direct vision prism system of claim 5 wherein each wavelength within each of the at least first and second energy bands is of a wavelength selected from the range between and including each of 100 nanometers and 100 micrometers, and wherein, no wavelength within the first band is the same as a wavelength within the second band.

7. The multi-band direct vision prism system of claim 6 wherein one of the first and second bands includes wavelengths selected from the range between and including each of 400 and 800 nanometers and the other of the first and second bands includes wavelengths selected from the range between and including each of 2.5 microns and 5.5 microns.

8. The multi-band direct vision prism of claim 5 wherein the first and second materials are selected such that
  (i) the first prismatic elements has a lesser dispersive effect than the second prismatic element on wavelengths within one of the first and second bands; and
  (ii) the second prismatic element has a lesser dispersive effect than the first prismatic element on wavelengths within the other of the first and second bands.

9. The multi-band direct vision prism system of claim 5 wherein
  (i) with respect to energy within the first band, wavelengths shorter than the un-deviated wavelength emerge angularly deviated at positive angles and wavelengths longer than the un-deviated wavelength of the first energy band emerge angularly deviated at negative angles with respect to the optical axis; and
  (ii) with respect to energy within the second band, wavelengths longer than the un-deviated wavelength emerge angularly deviated at positive angles and wavelengths shorter than the undeviated wavelength of the second energy band emerge angularly deviated at negative angles with respect to the optical axis.

* * * * *